(12) United States Patent
Martin et al.

(10) Patent No.: US 6,439,163 B1
(45) Date of Patent: Aug. 27, 2002

(54) WALL MOUNTABLE AQUARIUM

(76) Inventors: David Lee Martin; Hazel Laverne Martin, both of 16583 Prest, Detroit, MI (US) 48235

( * ) Notice: Subject to any disclaimer, the term of this patent is extended or adjusted under 35 U.S.C. 154(b) by 0 days.

(21) Appl. No.: 09/822,141

(22) Filed: Mar. 30, 2001

(51) Int. Cl.[7] ............................................. A01K 63/00
(52) U.S. Cl. ..................................................... 119/257
(58) Field of Search ................................ 119/257, 253, 119/259, 269, 262

(56) References Cited

U.S. PATENT DOCUMENTS

| | | | |
|---|---|---|---|
| 3,276,428 A | * 10/1966 | Burch | 119/257 |
| D214,630 S | 7/1969 | Lovitz | |
| 3,706,299 A | * 12/1972 | Hendges | 119/258 |
| 3,735,738 A | 5/1973 | Lake | |
| 3,855,970 A | * 12/1974 | Harwood | 119/260 |
| 4,136,638 A | * 1/1979 | Fedor | |
| D272,666 S | 2/1984 | James | |
| 5,435,270 A | 7/1995 | Newman | |
| D361,871 S | 8/1995 | Ichikawa | |
| D397,522 S | 8/1998 | Bishop | |

FOREIGN PATENT DOCUMENTS

FR          2642270       * 8/1990

* cited by examiner

*Primary Examiner*—Charles T. Jordan
*Assistant Examiner*—Yvonne R. Abbott

(57) ABSTRACT

A wall mountable aquarium includes a tank that has an interior space defined by a front wall, a back wall, a bottom wall and a pair of end walls. The interior space is adapted for containing fish and a habitat to support the fish. A sill plate is adapted to be coupled to a bottom of a frame for the picture window such that the sill plate is adapted to be aligned to the tank with the frame for the picture window. A heater assembly is coupled to the bottom wall of the tank; the heating assembly has an intake conduit and an output conduit adapted for circulating water of the habitat through a heat exchanger for warming the water.

6 Claims, 3 Drawing Sheets

WALL MOUNTABLE AQUARIUM

BACKGROUND OF THE INVENTION

1. Field of the Invention

The present invention relates to wall mountable aquariums and more particularly pertains to a new wall mountable aquarium for allowing a user to mount an aquarium onto the picture window to allow a user to view aquatic life as well as the outside surroundings.

2. Description of the Prior Art

The use of wall mountable aquariums is known in the prior art. More specifically, wall mountable aquariums heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,435,270; U.S. Pat. No. 3,735,738; U.S. Pat. No. Des. 272,666; U.S. Pat. No. Des. 397,522; U.S. Pat. No. Des. 214,630; and U.S. Pat. No. Des. 361,871.

While these devices fulfill their respective, particular objectives and requirements, the aforementioned patents do not disclose a new wall mountable aquarium. The inventive device includes a tank that has an interior space defined by a front wall, a back wall, a bottom wall and a pair of end walls. The interior space is adapted for containing fish and a habitat to support the fish. A sill plate is adapted to be coupled to a bottom of a frame for the picture window such that the sill plate is adapted to be aligned to the tank with the frame for the picture window. A heater assembly is coupled to the bottom wall of the tank, the heating assembly has an intake conduit and an output conduit adapted for circulating water of the habitat through a heat exchanger for warming the water.

In these respects, the wall mountable aquarium according to the present invention substantially departs from the conventional concepts and designs of the prior art, and in so doing provides an apparatus primarily developed for the purpose of a user to mount an aquarium onto the picture window to allow a user to view aquatic life as well as the outside surroundings.

SUMMARY OF THE INVENTION

In view of the foregoing disadvantages inherent in the known types of wall mountable aquariums now present in the prior art, the present invention provides a new wall mountable aquarium construction wherein the same can be utilized for a user to mount an aquarium onto the picture window to allow a user to view aquatic life as well as the outside surroundings.

The general purpose of the present invention, which will be described subsequently in greater detail, is to provide a new wall mountable aquarium apparatus and method which has many of the advantages of the wall mountable aquariums mentioned heretofore and many novel features that result in a new wall mountable aquarium which is not anticipated, rendered obvious, suggested, or even implied by any of the prior art wall mountable aquariums, either alone or in any combination thereof.

To attain this, the present invention generally comprises a tank that has an interior space defined by a front wall, a back wall, a bottom wall and a pair of end walls. The interior space is adapted for containing fish and a habitat to support the fish. A sill plate is adapted to be coupled to a bottom of a frame for the picture window such that the sill plate is adapted to be aligned to the tank with the frame for the picture window. A heater assembly is coupled to the bottom wall of the tank, the heating assembly has an intake conduit and an output conduit adapted for circulating water of the habitat through a heat exchanger for warming the water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wall mountable aquarium apparatus and method which has many of the advantages of the wall mountable aquariums mentioned heretofore and many novel features that result in a new wall mountable aquarium which is not anticipated, rendered obvious, suggested, or even implied by any of the prior art wall mountable aquariums, either alone or in any combination thereof.

It is another object of the present invention to provide a new wall mountable aquarium, which may be easily and efficiently manufactured and marketed.

It is a further object of the present invention to provide a new wall mountable aquarium, which is of a durable and reliable construction.

An even further object of the present invention is to provide a new wall mountable aquarium which is susceptible of a low cost of manufacture with regard to both materials and labor, and which accordingly is then susceptible of low prices of sale to the consuming public, thereby making such wall mountable aquarium economically available to the buying public.

Still yet another object of the present invention is to provide a new wall mountable aquarium which provides in the apparatuses and methods of the prior art some of the advantages thereof, while simultaneously overcoming some of the disadvantages normally associated therewith.

Still another object of the present invention is to provide a new wall mountable aquarium for a user to mount an aquarium onto the picture window to allow a user to view aquatic life as well as the outside surroundings.

Yet another object of the present invention is to provide a new wall mountable aquarium which includes a tank that has an interior space defined by a front wall, a back wall, a bottom wall and a pair of end walls. The interior space is adapted for containing fish and a habitat to support the fish. A sill plate is adapted to be coupled to a bottom of a frame for the picture window such that the sill plate is adapted to be aligned to the tank with the frame for the picture window. A heater assembly is coupled to the bottom wall of the tank, the heating assembly has an intake conduit and an output conduit adapted for circulating water of the habitat through a heat exchanger for warming the water.

Still yet another object of the present invention is to provide a new wall mountable aquarium that would fill the need for an improved fish aquarium that would provide a more visually appealing setup-within a home.

Even still another object of the present invention is to provide a new wall mountable aquarium that would be its novelty, attractiveness, versatility, relative inexpensiveness, and ease of use. The present invention could be made of bullet proof or tempered glass for rigidity under extreme temperature differences.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
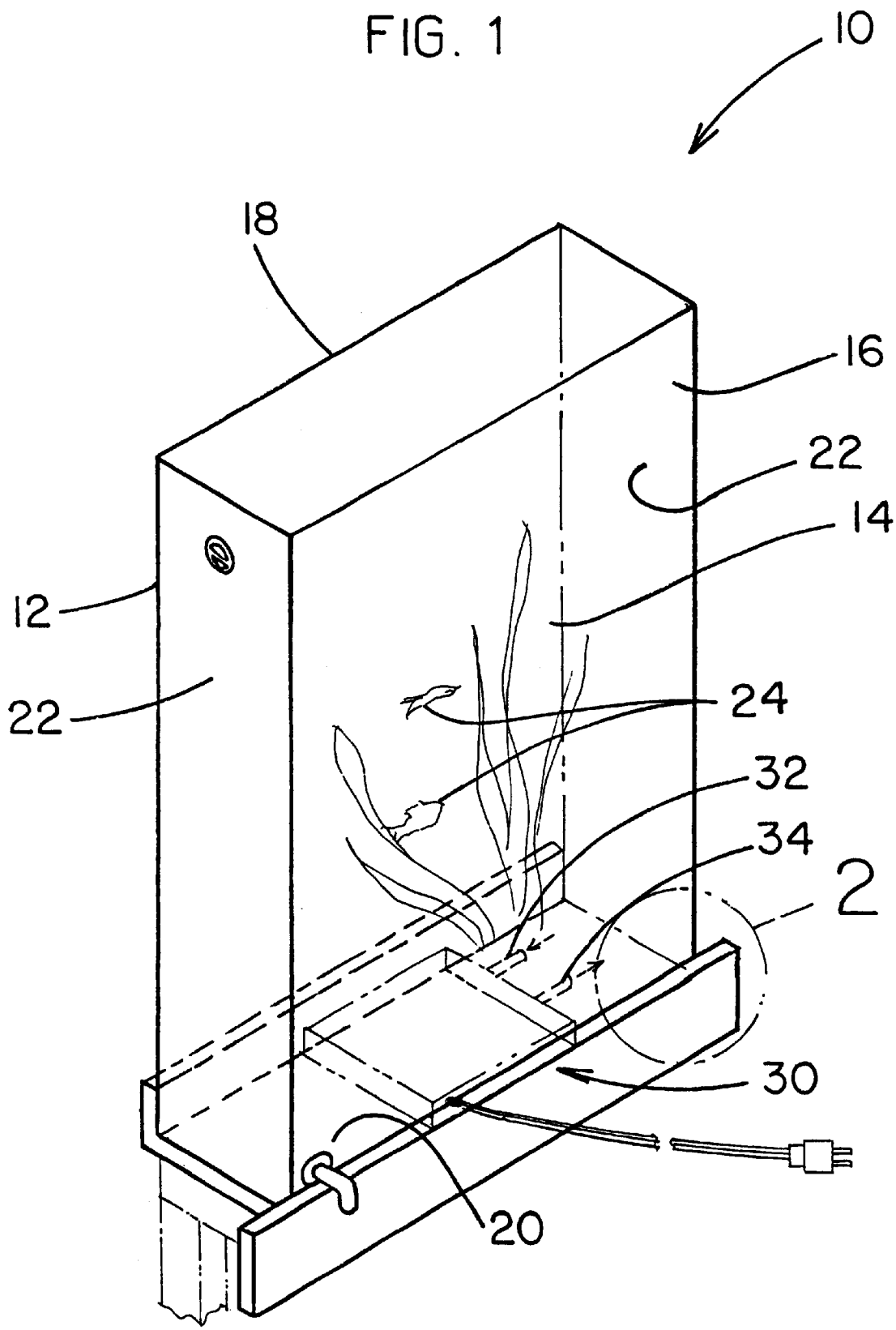
FIG. 1 is a perspective view of a new wall mountable aquarium according to the present invention.
Figure 2:
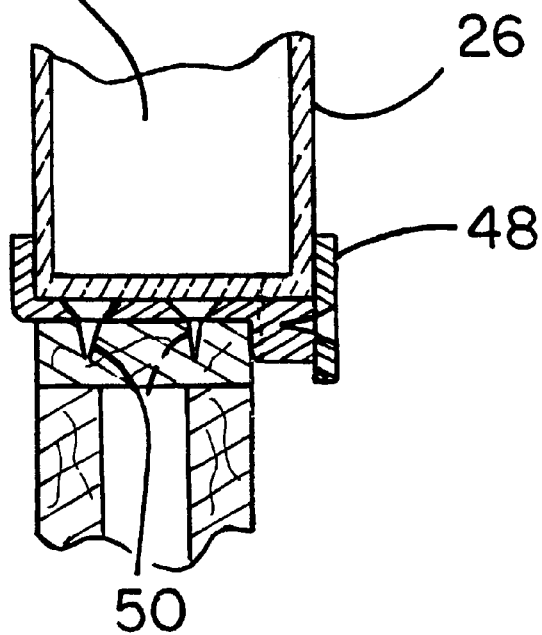
FIG. 2 is a cross-sectional view of the present invention.
Figure 3:
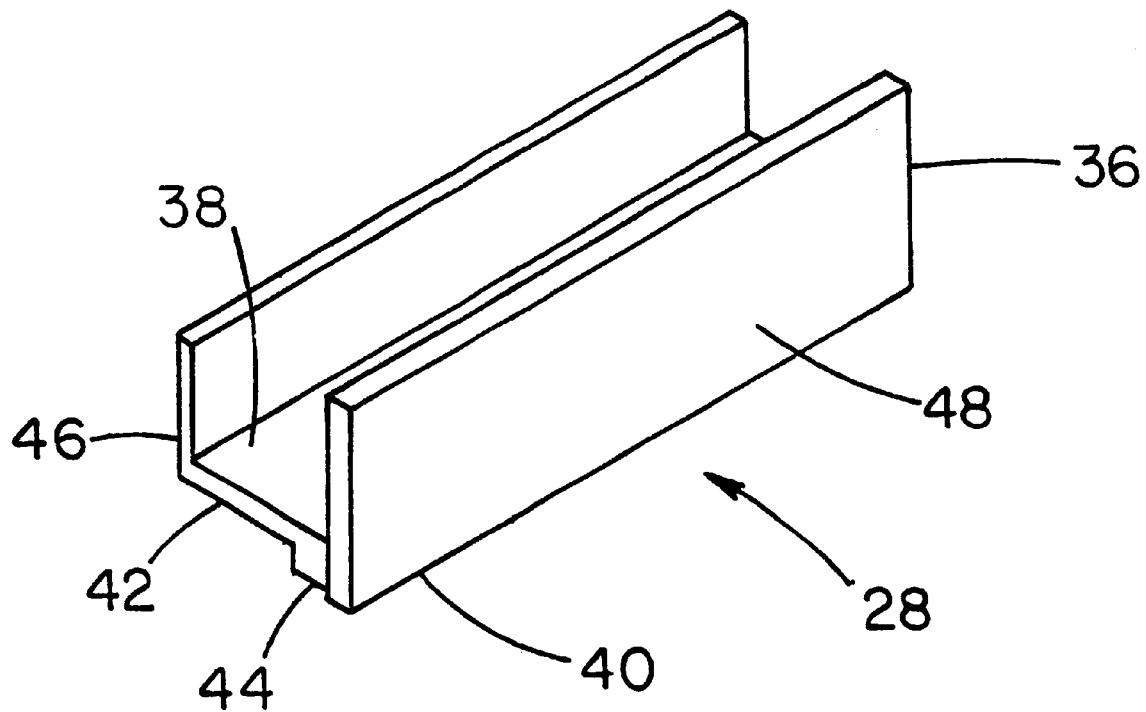
FIG. 3 is a perspective view of the present invention.
Figure 4:
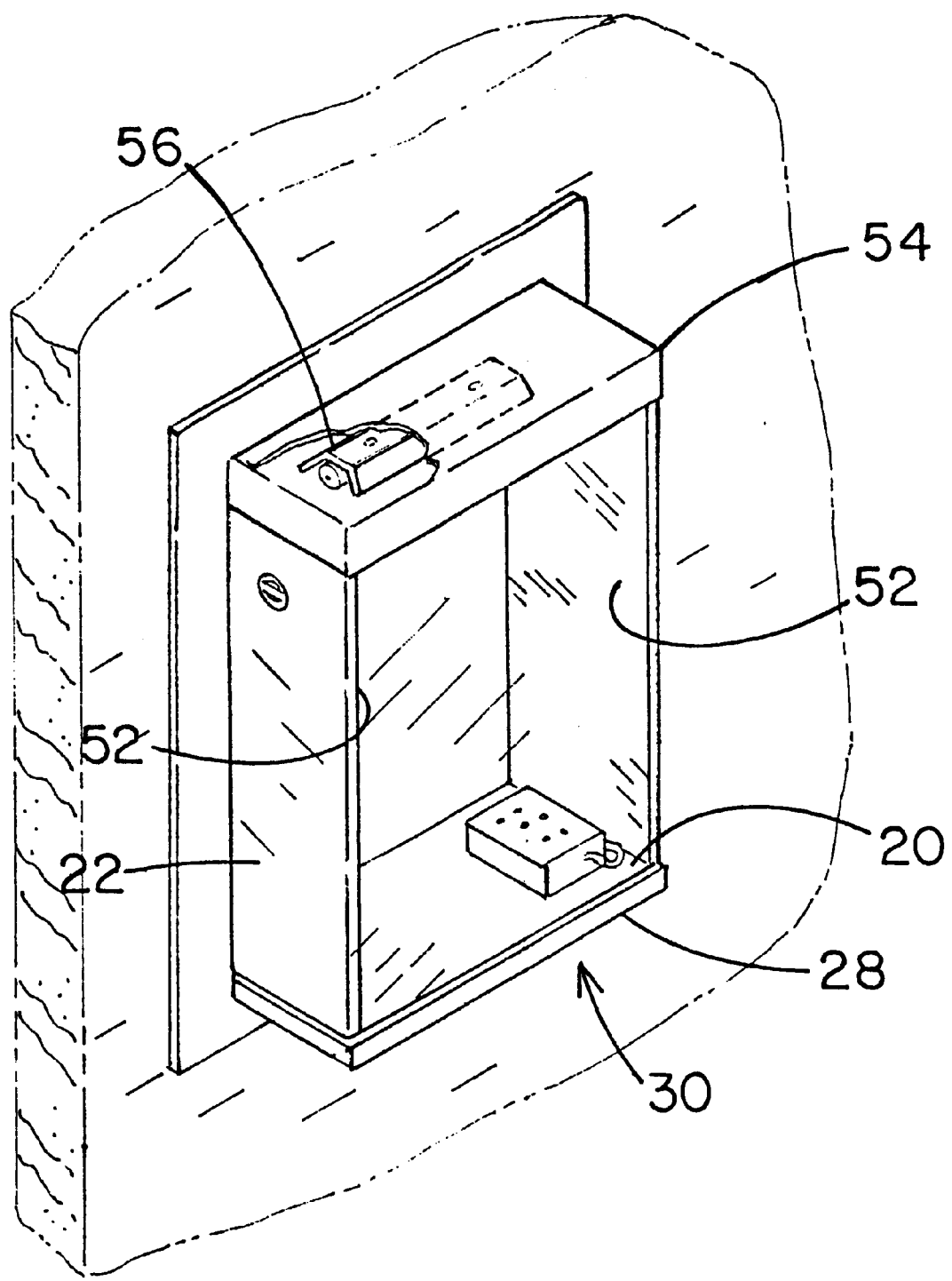
FIG. 4 is a perspective view of the present invention.

With reference now to the drawings, and in particular to FIGS. 1 through 4 thereof, a new wall mountable aquarium embodying the principles and concepts of the present invention and generally designated by the reference numeral 10 will be described.

As best illustrated in FIGS. 1 through 4, the wall mountable aquarium 10 generally includes a tank 12 that has an interior space 14 defined by a front wall 16, a back wall 18, a bottom wall 20 and a pair of end walls 22. The interior space 14 is adapted for containing fish 24 and a habitat to support the fish 24. A sill plate 28 is adapted to be coupled to a bottom of a frame 26 for the picture window such that the sill plate 28 is adapted to be aligned to the tank 12 with the frame 26 for the picture window. A heater assembly 30 is coupled to the bottom wall 20 of the tank 12; the heating assembly 30 has an intake conduit 32. And an output conduit 34 adapted for circulating water of the habitat through a heat exchanger for warming the water.

The sill plate 28 has a backing plate 36 and a base plate 38 such that the backing plate 36 upwardly extends from a front edge 40 of the sill plate 28. The bottom plate 42 of the tank 12 is for resting on the base plate 38 such that the front wall 16 of the tank 12 abuts the backing plate 36 for ensuring alignment of the bottom wall 20 of the tank 12 and the base plate 38 of the sill plate 28. The sill plate 28 has an alignment plate 44 that downwardly extends from a rear edge 46 of the base plate 38 opposite the backing plate 36. The alignment plate 44 is adapted to be abutted against a side of the bottom of the frame 26 to align the sill plate 28 with the frame 26. A facing plate 48 is coupled to the sill plate 28 such that the facing plate 48 is to be abutted against.

A plurality of fasteners 50 extends through the sill plate 28 adapted for securing the sill plate 28 to the bottom of the frame 26 26. Each of the end walls 22 comprise a mirror 52 such that each mirror 52 is adapted for preventing viewing of the frame 26 through the tank 12.

A cover 54 extends over an opening into the interior space 14 of the tank 12, the cover 54 has a light 56 to illuminate the interior space 14 of the tank 12.

In use, a user would mount the present invention would be mounted into the framework of a picture window so that fish would be visible while looking through the window. This design would also permit the fist to be viewed from indoors as well as outdoors.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wall mountable aquarium for replacing a picture window of a building, the wall mountable aquarium comprising:

a tank having an interior space defined by a front wall, a back wall, a bottom wall and a pair of end walls, said interior space being adapted for containing fish and a habitat to support the fish;

a sill plate being adapted for coupling to a bottom of a frame for the picture window such that said sill plate is adapted for aligning said tank with the frame for the picture window;

a heater assembly being coupled to said bottom wall of said tank, said heating assembly having an intake conduit and an output conduit adapted for circulating water of the habitat through a heat exchanger for warming the water;

said sill plate having a backing plate and a base plate such that said backing plate upwardly extends from a front edge of said sill plate, said bottom wall of said tank being for resting on said base plate such that said front wall of said tank abuts said backing plate for ensuring alignment of said bottom wall of said tank and said base plate of said sill plate; and said sill plate having an alignment plate downwardly extending from a rear edge of said base plate opposite said backing plate, said alignment plate being adapted for abutting against a side of the bottom of the frame to align said sill plate with the frame.

2. The wall mountable aquarium as set forth in claim 1, further comprising:

a facing plate being coupled to said sill plate such that said facing plate is for abutting against.

3. The wall mountable aquarium as set forth in claim 1, further comprising:

a plurality of fasteners extending through said sill plate adapted for securing said sill plate to the bottom of the frame.

4. The wall mountable aquarium as set forth in claim 1, wherein each of said end walls comprise a mirror such that each said mirror is adapted for preventing viewing of the frame through said tank.

5. The wall mountable aquarium as set forth in claim 1, further comprising:

a cover being for extending over an opening into said interior space of said tank, said cover having a light for illuminating said interior space of said tank.

6. A wall mountable aquarium for replacing a picture window of a building, the wall mountable aquarium comprising:

a tank having an interior space defined by a front wall, a back wall, a bottom wall and a pair of end walls, said interior space being adapted for containing fish and a habitat to support the fish;

a sill plate being adapted for coupling to a bottom of a frame for the picture window such that said sill plate is adapted for aligning said tank with the frame for the picture window; and a heater assembly being coupled to said bottom wall of said tank, said heating assembly having an intake conduit and an output conduit adapted for circulating water of the habitat through a heat exchanger for warming the water;

wherein said sill plate has a backing plate and a base plate such that said backing plate upwardly extends from a front edge of said sill plate, said bottom wall of said tank being for resting on said base plate such that said front wall of said tank abuts said backing plate for ensuring alignment of said bottom wall of said tank and said base plate of said sill plate;

wherein said sill plate has an alignment plate downwardly extending from a rear edge of said base plate opposite said backing plate, said alignment plate being adapted for abutting against a side of the bottom of the frame to align said sill plate with the frame;

wherein a facing plate being coupled to said sill plate such that said facing plate is for abutting against;

wherein a plurality of fasteners extending through said sill plate adapted for securing said sill plate to the bottom of the frame;

wherein each of said end walls comprise a mirror such that each said mirror is adapted for preventing viewing of the frame through said tank;

wherein a cover being for extending over an opening into said interior space of said tank, said cover having a light for illuminating said interior space of said tank.

\* \* \* \* \*